(12) United States Patent
Straccia et al.

(10) Patent No.: US 7,981,219 B2
(45) Date of Patent: Jul. 19, 2011

(54) SYSTEM FOR PLASMA TREATING A PLASTIC COMPONENT

(75) Inventors: Ann Straccia, Southgate, MI (US); Larry P. Haack, Ann Arbor, MI (US); Joseph Walter Holubka, Livonia, MI (US); Thomas Murray, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 906 days.

(21) Appl. No.: 11/609,495

(22) Filed: Dec. 12, 2006

(65) Prior Publication Data

US 2008/0134970 A1 Jun. 12, 2008

(51) Int. Cl.
*C23C 16/00* (2006.01)
*C23F 1/00* (2006.01)
*H01L 21/306* (2006.01)

(52) U.S. Cl. ........ 118/729; 118/728; 118/730; 118/731; 156/345.51; 156/345.54; 156/345.55

(58) Field of Classification Search .................. 118/728, 118/729, 730, 500, 669; 156/345.51, 345.52, 156/345.53; 269/20
See application file for complete search history.

(56) References Cited

U.S. PATENT DOCUMENTS

| | | | | |
|---|---|---|---|---|
| 4,102,964 A | * | 7/1978 | Ridgeway | 264/511 |
| 4,721,630 A | * | 1/1988 | Takeo et al. | 427/236 |
| 4,874,639 A | * | 10/1989 | Matsui et al. | 427/240 |
| 5,169,675 A | | 12/1992 | Bartoszek-Loza et al. | |
| 5,370,745 A | * | 12/1994 | Litteral | 118/669 |
| 5,437,894 A | | 8/1995 | Ogawa et al. | |
| 5,702,772 A | | 12/1997 | Skelly et al. | |
| 5,770,273 A | * | 6/1998 | Offer et al. | 427/455 |
| 5,820,808 A | | 10/1998 | van Oene et al. | |
| 5,829,804 A | | 11/1998 | Saeki et al. | |
| 5,837,958 A | | 11/1998 | Fornsel | |
| 5,916,674 A | | 6/1999 | Skelly et al. | |
| 6,042,163 A | * | 3/2000 | Reiffer | 293/155 |
| 6,374,158 B1 | * | 4/2002 | Fusaro, Jr. | 700/254 |
| 6,398,622 B1 | * | 6/2002 | Chern et al. | 451/22 |
| 6,746,203 B2 | * | 6/2004 | Leblanc et al. | 414/796.9 |
| 6,800,336 B1 | | 10/2004 | Fornsel et al. | |

(Continued)

FOREIGN PATENT DOCUMENTS

WO 0071340 11/2000

(Continued)

OTHER PUBLICATIONS

Search Report for the corresponding Great Britain Application No. GB 0723674.8 mailed Apr. 1, 2008.

(Continued)

*Primary Examiner* — Maureen Gramaglia
*Assistant Examiner* — Tiffany Nuckols
(74) *Attorney, Agent, or Firm* — Raymond L. Coppiellie; Brooks Kushman P.C.

(57) ABSTRACT

A system is provided for plasma treating a plastic component having an exterior surface and an inside surface. The system comprises at least one fixture. The fixture includes a support structure, a plurality of locating features, and a plurality of holding devices which cooperate to position a portion of the exterior surface to within a specified tolerance. The system further comprises at least one APAP nozzle configured to move relative to the exterior surface along a path, wherein the APAP nozzle directs a plasma jet onto the portion producing a functionalized polymer layer covering the portion.

20 Claims, 7 Drawing Sheets

U.S. PATENT DOCUMENTS

| | | |
|---|---|---|
| 6,821,379 B2 | 11/2004 | Datta et al. |
| 6,875,303 B2 | 4/2005 | Samurkas et al. |
| 2003/0155332 A1 | 8/2003 | Datta et al. |
| 2004/0258850 A1 | 12/2004 | Straccia et al. |
| 2005/0178330 A1 | 8/2005 | Goodwin et al. |
| 2006/0118242 A1 | 6/2006 | Herbert et al. |
| 2006/0156983 A1 | 7/2006 | Penelon et al. |
| 2006/0263529 A1 | 11/2006 | Lustiger et al. |
| 2008/0118734 A1 | 5/2008 | Goodwin et al. |

FOREIGN PATENT DOCUMENTS

| | | |
|---|---|---|
| WO | 2005059040 | 6/2005 |
| WO | 2005089957 | 9/2005 |

OTHER PUBLICATIONS

Office Action for U.S. Appl. No. 11/609,501 dated Dec. 18, 2009.

\* cited by examiner

SYSTEM FOR PLASMA TREATING A PLASTIC COMPONENT

BACKGROUND OF THE INVENTION

1. Field of the Invention

The present invention relates generally to a system for plasma treating a plastic component.

2. Background Art

Plastic components commonly have appearance and durability requirements depending on their application. For example, a plastic trim component, such as a bumper fascia or an instrument panel, may be decorated with a paint and have both distinctness of image (DOI) and paint adhesion requirements. DOI is an objective appearance criterion for brilliance and gloss which includes the visual effects from a rough or bumpy coating surface, sometimes referred to as "orange peel." DOI may be measured, for example, with a BYK-Gardner wave-scan unit. Both paint adhesion and DOI are dependent on the interfacial surface chemistries between the plastic component and the paint.

Factors influencing the surface chemistry of a plastic component may include the type of plastic used, contamination on the surface prior to coating, and the presence of mold release agents. The surface chemistry is also subject to scratch, slip or process additive packages which may effectively lower the surface's coefficient of friction. These factors contribute to the overall surface energy of the plastic. Moreover, a lower surface energy plastic may be more difficult to coat, due in part to poor wet-out of the surface by the coating, which may result in "orange peel" and a lack of paint adhesion.

In order to overcome these factors, the plastic surface may be prepped prior to coating or a more elaborate painting process may be employed. For example, a multi-step aqueous acid or base chemical wash process with flashing ovens may be used to remove mold release agents and contaminates. Alternatively, a plastic system with an aggressive solvent package may be used to initially swell the plastic surface, thus, allowing for polymer entanglement between the plastic and the paint. Also, a chlorinated polyolefin adhesion promoter (ad pro) may be used as a surface prep prior to applying a decorative paint. However, the use of aggressive solvents or chlorinated polyolefin adhesion promoters is often undesirable for both economic and environmental reasons.

More recently, vacuum plasma treatment has been used to increase the surface energy of plastic components prior to painting. This method often eliminates or minimizes the need for further surface preparation or for a more elaborate painting process. However, this methodology may require major expenditures for equipment, including vacuum chambers which command a less efficient batch processing approach.

There is a need for a methodology and a system for treating and coating a plastic component which may avoid some of these undesirable results.

SUMMARY OF THE INVENTION

A system is provided for plasma treating a plastic component having an exterior surface and an inside surface. The system comprises at least one fixture. The fixture includes a support structure for supporting the plastic component. A plurality of locating features are provided on the support structure that positions the plastic component relative to the fixture. A plurality of holding devices are provided on the support structure that hold the plastic component to the fixture. The support structure, the locating features and the holding devices cooperate to position at least a portion of the exterior surface to within a specified tolerance. The system further comprises at least one atmospheric-pressure air plasma nozzle that moves relative to the exterior surface along a path. The nozzle directs a plasma jet onto the portion of the exterior surface to produce a layer of functionalized polymer.

In another embodiment, a system is provided for plasma treating a plastic component having an exterior surface and an inside surface. The system comprises at least one moveable fixture including a support structure. The support structure includes a plurality of spaced apart support members, each having a contact surface configured to match a portion of the inside surface adjacent to the support member, whereby the plastic component is supported. A plurality of locating features are provided on the support structure that position the plastic component relative to the fixture. A plurality of holding devices are provided on the support structure that hold the plastic component to the fixture. The support structure, the locating features and the holding devices cooperate to position at least a portion of the exterior surface to within a specified tolerance. The system further comprises at least one atmospheric-pressure air plasma nozzle positioned approximately 2 to 20 mm from the portion of the exterior surface. The nozzle moves relative to the exterior surface along a path at a speed in the range of approximately 50 to 600 mm/sec. The nozzle directs a plasma jet onto at least the portion of the exterior surface to produce a functionalized polymer layer covering the portion of the exterior surface.

DETAILED DESCRIPTION OF THE PREFERRED EMBODIMENT(S)

Figure 1:
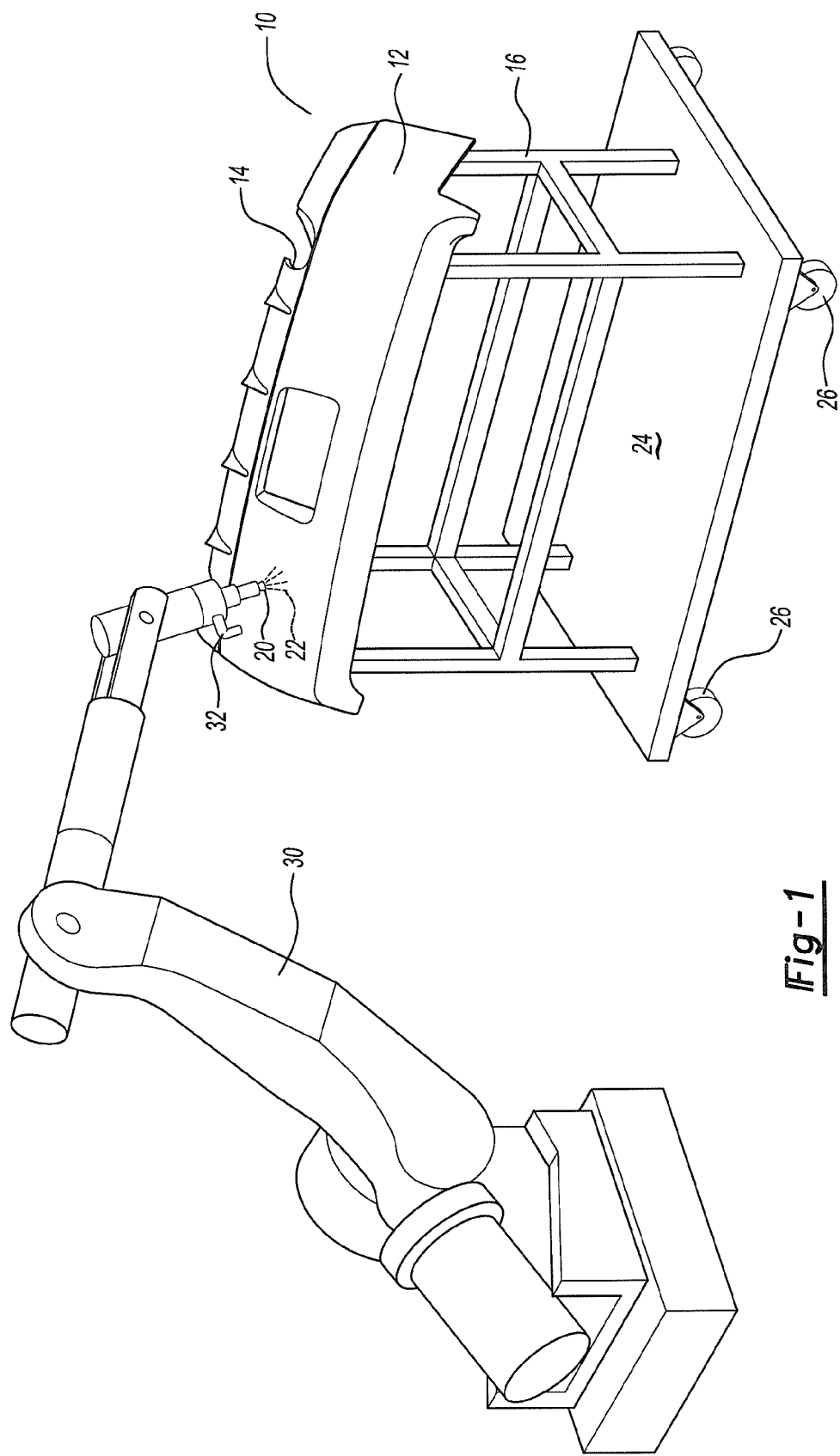
FIG. 1 is a perspective view of a system for plasma treating a plastic component.

Detailed embodiments of the present invention are disclosed herein. It is understood however, that the disclosed embodiments are merely exemplary of the invention and may be embodied in various and alternative forms. The figures are not necessarily to scale, some figures may be exaggerated or minimized to show the details of the particular component. Therefore, specific structural and functional details disclosed herein are not to be interpreted as limiting, but merely as a representative basis for the claims and for teaching one skilled in the art to practice the present invention.

Embodiments of a system for plasma treating a plastic component and a method for decorating the same with a coating will now be described. Vacuum plasma treatment of plastic components is used to prepare the surfaces of the components prior to coating. This process can alter the surface of the entire part and may allow application of a topcoat paint directly onto the surface of the plastic component without the use of a primer. One negative aspect of this form of surface treatment is that it is primarily limited to batch processing due to the requirement of a low pressure chamber, where the components must be placed during treatment. For high volume applications, this approach may be very limiting.

Recent developments in plasma treatment technology have resulted in a process called atmospheric-pressure air plasma (APAP). This technology alters the surface of the plastic component in preparation for a coating but does not require the use of a low pressure chamber. The altered surface results from the formation of a functionalized polymer layer. More specifically, many plastics have surface chemistries comprised of long non-polar polymer chains, which may have low surface energy. Moreover, these surfaces may also be chemically non-reactive. For example, TPO, polyethylene, and polypropylene are common examples of non-polar plastics. Polar polymers like ABS and polycarbonate (PC) may still benefit from APAP because they still have relatively low surface energies compared to other non-plastic substrates. Moreover, conductive polymers commonly used in electrostatic painting processes, such as for example, conductive TPO may also benefit from APAP. Functionalizing the surface polymers increases the surface energy allowing a coating to wet-out the surface. Poor wet-out of a surface by a coating may result in inadequate paint adhesion and undesirable DOI values resulting from "orange peel."

One functionalizing mechanism which may occur on a plastic surface from APAP treatment is oxidation and/or the addition of amines, $NO_x$, —OH and —NH functional groups onto the surface polymers. Chemical conversion of the surface polymers by APAP treatment results in enhanced polar characteristics. Coatings such as, for example, adhesives, paints, primers, and adhesion promoter, are typically formulated with polar polymers. When a solid polar polymer/plastic interfaces with a liquid polar coating, the surface tension between the two phases is minimized, allowing the liquid phase to spread more evenly onto the solid phase and wet-out the plastic surface.

Applicants have discovered how to apply the APAP technology to plastic components in a production setting as a suitable surface treatment prior to coating. More specifically, Applicants have discovered that APAP may form a functionalized polymer layer on the surface of a plastic component when used within a given processing window. However, this processing window may be atypical for many plastic component manufacturing processes where dimensional instability is more tolerable. This dimensional instability is often an inherent property for many plastics, which results from their relatively low flexural modulus and propensity to warp. The issue of dimensional instability is most pronounced when the plastic component is a large contoured trim part, such as for example, a bumper fascia or an instrument panel. Accordingly, Applicants needed to determine how to bridge the gap of dimensional instability, inherent with many plastic components, with the higher precision required by the APAP treatment.

The following experiments demonstrates at least one embodiment of the present invention. Thermoplastic polyolefin (TPO) bumper fascias were treated by APAP according to the matrix of parameters provided below in Table 1. The APAP treatment was applied by an atmospheric-pressure air plasma nozzle which produces a plasma jet. The atmospheric-pressure air nozzle was an Openair® plasma nozzle supplied by Plasmatreat North American Incorporated.

As outlined in Table 1, seven fascias were used in the testing. Fascia 7 was a control sample, which represented a more traditional treatment approach using an adhesion promoter coating, which was applied and cured prior to topcoat painting. The other six fascias used a combination of either a wash treatment or no wash treatment in conjunction with the APAP treatment. The APAP nozzle was moved relative to the exterior surface of the fascia at the speeds recited in the table with the plasma jet directed onto the surface. Several samples were treated at a rate of 100 mm/sec and others were treated at a rate of 300 mm/sec. The APAP nozzle was also positioned approximately 10 mm from the surface of the fascia. The purpose of washing, sometimes referred to as power washing, was to determine how critical removing gross contaminates was compared to the effectiveness of the plasma treatment process.

After painting, treated fascias, along with the control fascia were measured for the degree of "orange peel" based on distinctness of image (DOI) measurements using a wave-scan unit. Table 2 compares the amount of improvement in appearance using quality measurement system (QMS) values. Results show an average improvement with plasma treatment of 22% on vertically painted surfaces and 13% on horizontally painted surfaces when compared with the control sample.

Referring to Table 3, TPO fascias were treated by APAP according to the matrix of parameters given in Table 1. Cut sections from each fascia were subjected to a 45 minute fuel soak test. Results showed no paint lost for plasma treated TPO and a 15% paint loss for the conventional adhesion promoter process. The difference observed here may be attributed to the fact that conventional adhesion promoter coatings bond to the substrate by a physical entanglement process, whereas the APAP treatment process creates covalent chemical bond linkages between the functionalized surface and the paint coating. The physical entanglement bond may be more susceptible to breakdown from fuel diffusing into the bond interface than the covalent chemical bonds.

As reflected in Table 3, fascias 1 and 2 were prepared without the pre-wash prior to plasma treatment and did not exhibit paint adhesion loss or disruption of the paint from the 45 minute fuel soak test. Fascias 3 and 4, were pre-washed prior to plasma treatment, and also did not exhibit paint adhesion loss or disruption of the paint from the 45 minute fuel soak test. Fascias 5 and 6, were power washed subsequent to plasma treatment, and also did not exhibit paint adhesion loss or disruption of the paint from the 45 minute fuel soak test. The process parameters identified in Table 1 (for this particular TPO substrate) exhibited satisfactory visual appearance and durability results for painted bumper fascias.

TABLE 1

APAP Treatment Test Matrix

| Fascia | CLEANING | SPEED (mm/sec) | DISTANCE (mm) |
|---|---|---|---|
| 1 | No Wash "as molded" | 100 | 10 |
| 2 | No Wash "as molded" | 300 | 10 |
| 3 | Washed "before treatment" | 100 | 10 |
| 4 | Washed "before treatment" | 300 | 10 |
| 5 | Washed "after treatment" | 100 | 10 |
| 6 | Washed "after treatment" | 300 | 10 |
| 7 | Washed before Adhesion Promoter | — | — |

TABLE 2

Paint Appearance Improvements Using APAP Compared To Conventional Adhesion Promoter

| | % Improvement in Appearance with Plasma Treatment | |
|---|---|---|
| Facia | Vertically Painted Surface | Horizontally Painted Surface |
| 1 | 25% | 14% |
| 2 | 19% | 7% |
| 3 | 27% | 17% |
| 4 | 20% | 14% |
| 5 | 22% | 18% |
| 6 | 23% | 10% |
| Average | 22% | 13% |

TABLE 3

Paint Removal Results After 45 Minute Gasoline Soak Test

| Fascia | % Paint Removal |
|---|---|
| 1 | 0% |
| 2 | 0% |
| 3 | 0% |
| 4 | 0% |
| 5 | 0% |
| 6 | 0% |
| 7 | 15% |

Referring to FIG. 1, a system for plasma treating a plastic component is provided in accordance with one embodiment of the present invention. The plastic component 10 has an exterior surface 12 and an inside surface 14. The plastic component 10 may be made of any suitable plastic resin material, such as for example, TPO, TPE, polyester, polyurethane, PE, PC, ABS, conductive polymers, or polypropylene. The plastic component may be made by injection molding, thermoforming, slush molding or any other suitable manufacturing process known to those skilled in the art. Moreover, the plastic component may be a large contoured component, such as for example, a bumper fascia or an instrument panel. Alternatively, the plastic component may be a relatively small component, such as for example, a housing.

The system comprises at least one fixture that is generally indicated by reference numeral 16. The fixture 16 may be made of any suitable material that is structural and dimensionally stable, such as, aluminum, steel, other types of metal or metal alloys. Alternatively, the fixture 16 may be made from a filled polymer or composite, such as Ren-Wood or fiberglass-epoxy.

The system further comprises at least one atmospheric-pressure air plasma nozzle 20 that produces a plasma jet 22. The details of the plasma nozzle and the plasma jet are set forth in column 3, line 39 through column 6, line 6, of U.S. Pat. No. 6,800,336, the disclosure of which is incorporated herein by reference. Other suitable atmospheric-pressure air nozzles known by those skilled in the art may also be used.

The atmospheric-pressure air plasma nozzle 20 moves relative to the exterior surface 12 along a path. The atmospheric-pressure air plasma nozzle 20 directs a plasma jet 22 onto at least a portion of the exterior surface 12 producing an area of the surface that is covered with a functionalized polymer. A functionalized polymer layer covering at least the portion is created from multiple contiguous areas that are produced in multiple passes of the atmospheric-pressure air plasma nozzle 20 relative to the exterior surface 12. For example, a bumper fascia, which is to be two-tone color decorated, may be plasma treated in this manner. The fascia may be made of a pre-colored or molded-in-color plastic resin, thus providing a single color fascia. Plasma treating a portion of the exterior surface and painting only the treated portion with a second color of paint may provide a decorated two color fascia. Moreover, plasma treating may be used in combination with either hard or soft masking for an enhanced two color affect. Alternatively, the entire exterior surface 12 may be plasma treated for subsequent coating.

The atmospheric-pressure air plasma nozzle 20 (APAP nozzle) may be positioned approximately 2 to 20 millimeters (mm) from the exterior surface 12. The APAP nozzle 20 may move relative to the exterior surface 12 at a speed in the range of approximately 50 to 600 millimeters per second (mm/sec). For example, if the APAP nozzle 20 moves at 100 mm/sec in one direction and the plastic component 10 on the fixture 16 moves in an opposite direction at 100 mm/sec, the APAP nozzle 20 moves relative to the exterior surface 12 at a speed of approximately 200 mm/sec. In at least one embodiment, the APAP nozzle 20 is positioned approximately 5 to 15 mm from the exterior surface 12 and moves relative to the exterior surface 12 at a speed in the range of approximately 250 to 350 mm/sec.

The fixture 16 may be moveable. The fixture 16 may be mounted, attached or coupled with a carrier 24. In at least one embodiment, the carrier 24 has wheels 26 for moving along a surface. The carrier 24 may include a plurality of fixtures 16. The carrier 24 may, for example, be chain driven or part of a motorized conveyor system, such as an in-line system. Alternatively, the carrier 24 may be part of an over-head conveyor system. Other suitable carrier 24 configuration may also be used.

The system may further comprise at least one robot 30 that positions the APAP nozzle 22 proximate the exterior surface 12 and moves the APAP nozzle 20 relative to the exterior surface 12 along a path. The robot 30 may be, for example, a 6-axis robot capable of moving relative to a plastic component 10 with a complex geometry. Alternatively, the robot 30 may have fewer axes of movement for positioning the nozzle 20 relative to a plastic component 10 with a less complex geometry.

The system may further comprise a positional sensor 32, that may be attached to the robot 30 or any other suitable proximate location. The positional sensor 32 senses the distance from the sensor 32 to the exterior surface 12 near the plasma jet 22. The sensor 32 determines the position of the surface 12 and communicates the position data to a controller for the APAP nozzle 20. For example, the positional sensor 32 may interface with the robot 30 via the controller, wherein positional communication with the APAP nozzle 20 is achieved via the controller and the robot 30. Alternatively, the positional sensor 32 may interface with a CNC rail gantry arrangement that is interfaced with the APAP nozzle. Positional communication between the positional sensor 32 and the APAP nozzle 20 may be achieved via the CNC rail gantry arrangement. The positional sensor 32 may be, for example, a vision guidance sensor or a contact sensor which contacts the exterior surface 12. Other suitable sensors known to those skilled in the art may also be used.

Figure 2:
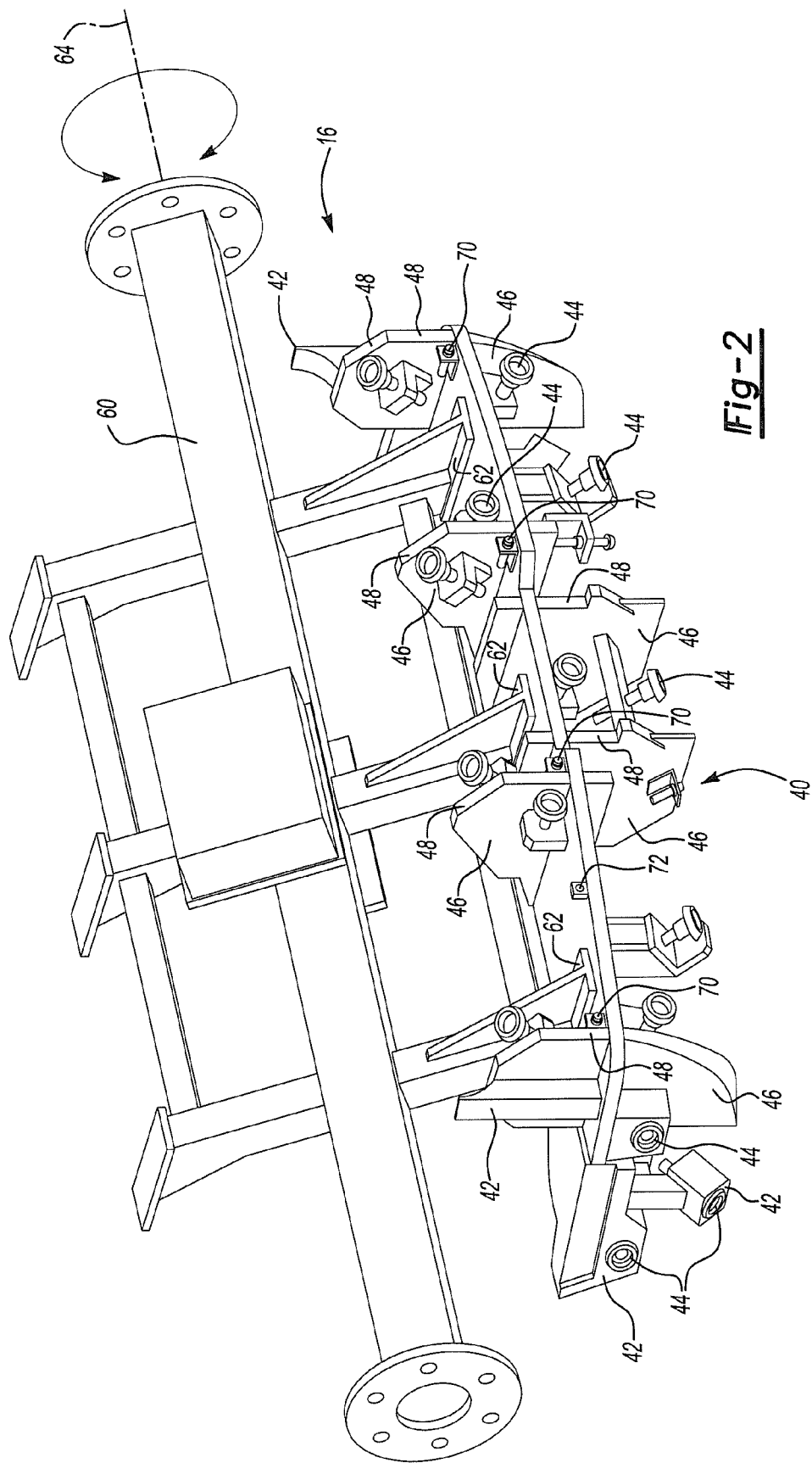
FIG. 2 is a perspective view of a fixture and a trunnion for a plasma treating system.

Referring to FIG. 2, a perspective view of a fixture 16 for a plasma treating system in accordance with an embodiment of the present invention is provided. The fixture 16 includes a support structure 40 that contacts the inside surface 14 to support the plastic component 10. The support structure 40 may be made of any suitable material which is structural and dimensionally stable. For example, steel or aluminum would be suitable materials. Alternatively, a highly filled polymer such as Ren-Wood may also be suitable.

The fixture 16 further includes a plurality of locating features 42 provided on the support structure 40 to position the plastic component 10 relative to the fixture 16. For example, the locating features 42 may be pins, dowels or other positive features on the support structure 40, which may be respectively matched and aligned with slots, holes or other negative features provided by the plastic component 10. A suitable 2-way and 4-way locating arrangement may be achieved with these features to position the plastic component 10 relative to the fixture 16. Alternatively, various surfaces of the support structure 40 may be matched and aligned with the inside surface 14 to position the plastic component 10 relative to the fixture 16. Other suitable locating features known to those skilled in the art may also be used.

The fixture 16 further includes a plurality of holding devices 44 provided on the support structure 40 to hold the plastic component 10 to the fixture 16. The support structure 40, locating features 42, and holding devices 44 cooperate to position at least a portion of the exterior surface 12 to within a specified tolerance. In at least one embodiment, the specified tolerance is within about ±5 mm.

The holding devices 44 may be suction cups that interface with a vacuum source. For example, the suction cups may be continually ported to a vacuum source or may be intermittently ported to a vacuum source. In at least one embodiment, the fixture 16 is configured to move along a production line that has multiple stop stations. The suction cups may be ported to a vacuum source at each stop station but otherwise are not ported to the vacuum source when the fixture 16 is moving along the production line. Applicants have discovered that the suction cups may be sufficiently sealed between stop stations to hold the plastic component 10 to the fixture 16 during movement. Alternatively, the holding devices 44 may be clamps or spring-loaded mechanical clips which may also be automated. Moreover, the holding devices may be wedging devices that function by insertion and expansion or twisting one device into another. Other suitable holding devices known by those skilled in the art may also be used.

The support structure 40 may include a plurality of spaced apart support members 46. The support members 46 may each have a contact surface 48 that is configured to match the inside surface 14 adjacent to the support member 46.

The support members 46 may be spaced apart to substantially support and locate the plastic component 10 such that at least the portion of the exterior surface 12 is positioned to within the specified tolerance. For example, a suitable spacing between the support members 46 of 100 to 300 mm may be used to position an exterior surface 12 of a TPO bumper fascia to within a tolerance of ±2 mm.

Figure 6:
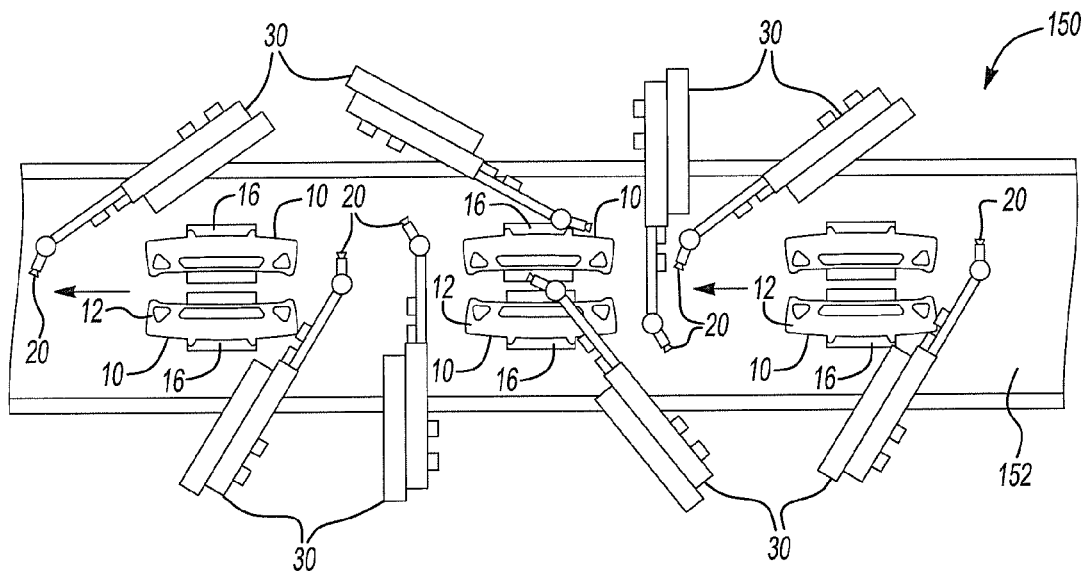
FIG. 6 is a plan view of the system for plasma treating the plastic component.
Figure 7:
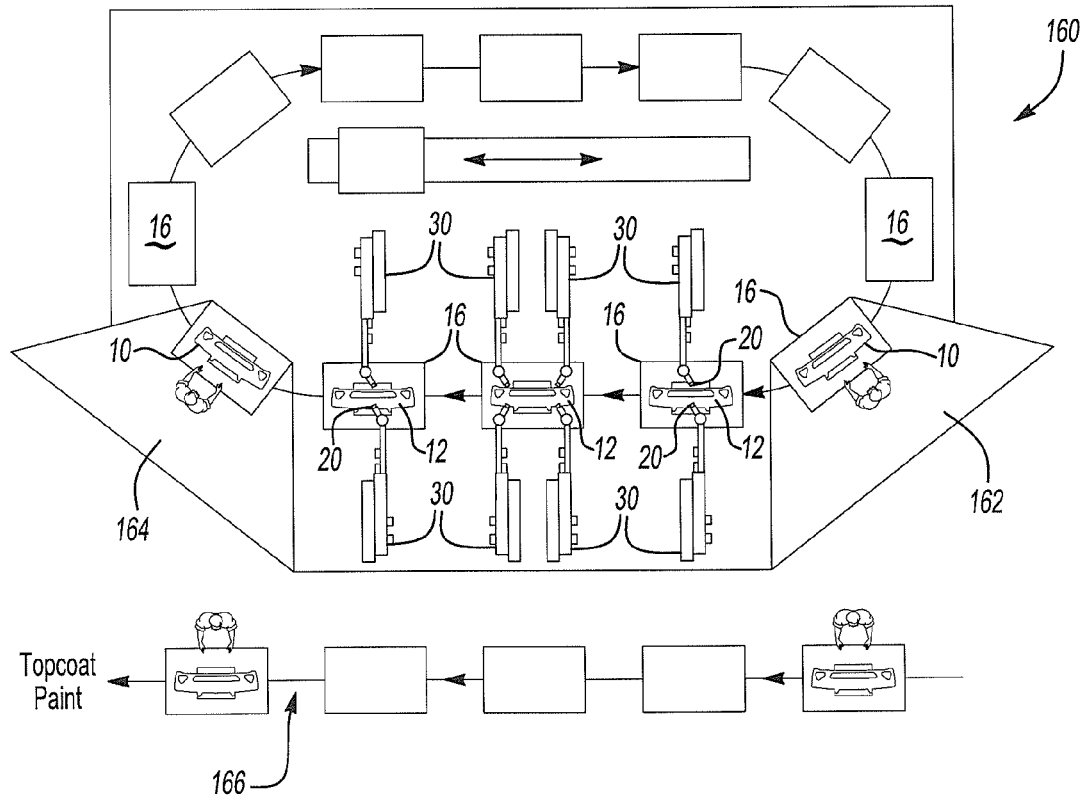
FIG. 7 is a plan view of the system for plasma treating the plastic component.

Even during movement of the fixture 16, at least the portion of the exterior surface 12 is held substantially within the specified tolerance. For example, as shown in FIGS. 6 and 7, the fixture 16 may be attached to a conveyance system as part of an in-line or circular production line. Alternatively, as shown in FIGS. 2-5, the fixture 16 may be attached to a trunnion, which rotates about an axis. Moreover, the fixture 16 may include rollers or wheels to facilitate movement along a surface.

Referring to FIGS. 2-5, the system may further comprise a primary trunnion 60 which is connected to the fixture 16 at predetermined locations 62. The primary trunnion 60 rotates about a primary axis 64.

The fixture 16 may further include a plurality of force sensors 70 disposed on the support structure 40. Each force sensor 70 may be configured to transmit a signal when the plastic component 10 is positioned on the fixture 16. In at least one embodiment, the force sensor 70 is a contact sensor, which transmits a signal when the plastic component 10 touches the contact sensor. Other suitable force sensors 70 known to those skilled in the art may be used for sensing a force exerted by a part.

At least one holding device 44, such as a clamp or suction cup, may automatically hold the plastic component 10 to the fixture 16 in response to the force sensor's 70 signal. The force sensors 70 may be positioned on the support structure 40 such that when the plastic component 10 is loaded onto the fixture 16, the holding devices 44 automatically hold the entire plastic component 10 to the fixture 16.

The fixture 16 may further include a component presence sensor 72 that is disposed on the support structure 40. The component presence sensor 72 transmits a signal in response to the plastic component 10 being positioned on the fixture 16. In at least one embodiment, the APAP nozzle 20 directs the plasma jet 22 towards the component 10 in response to the signal. Unless the APAP nozzle 20 receives the signal, the plasma jet 22 will not be generated or directed towards the component 10. The component presence sensor 72 may be a light or contact type sensor. Other suitable sensors may also be used for detecting the presence of a part.

Figure 3:
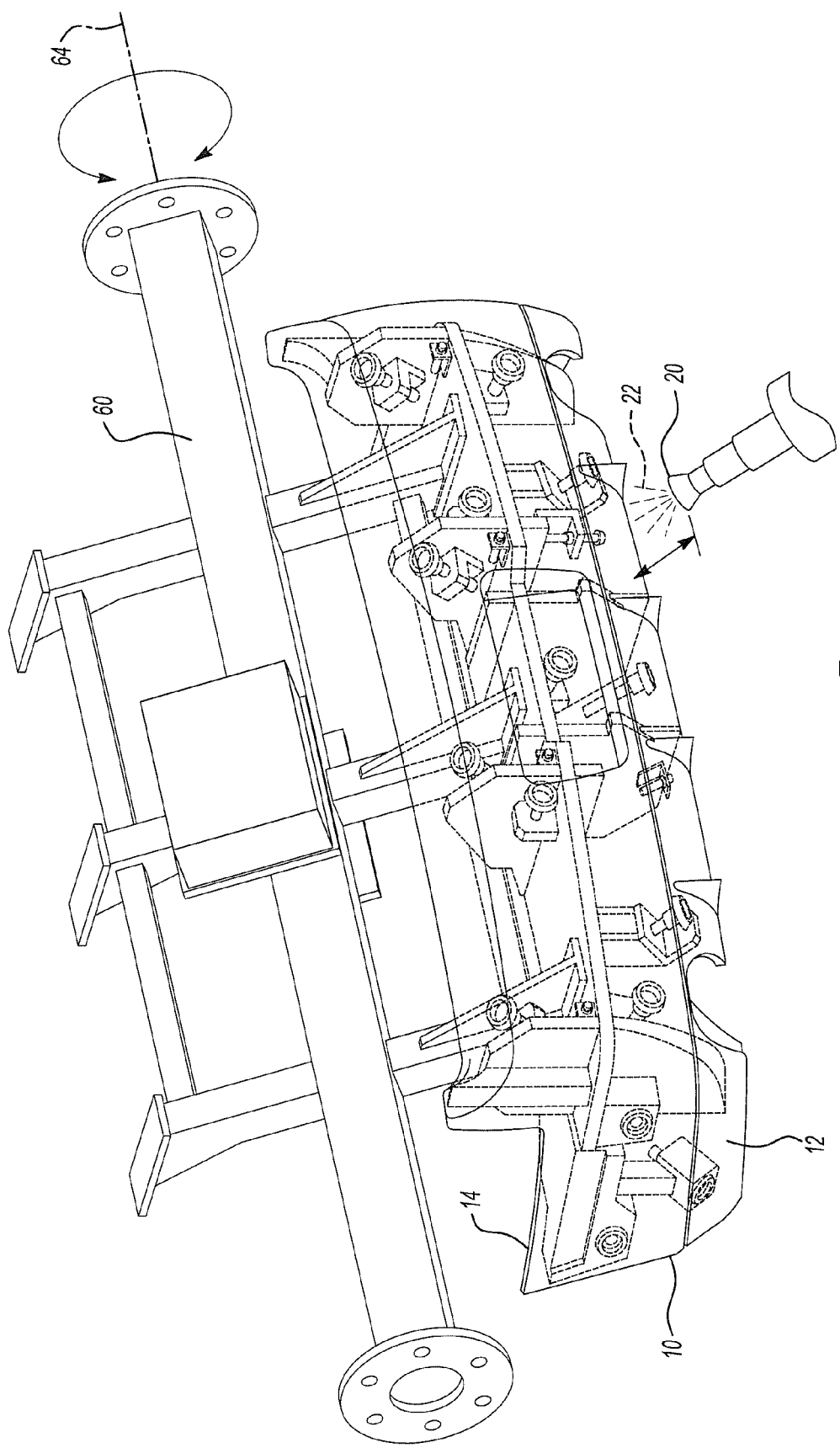
FIG. 3 is a perspective view of the fixture with a plastic component and the trunnion for a plasma treating.

Referring to FIGS. 2 and 3, the fixture 16 is shown with a plastic component 10 and an APAP nozzle 20. The plastic component 10 is positioned on the fixture 16 and is supported by the support members 46. The support members 46 cooperate with the locating features 42 and holding devices 44 to position at least a portion of the exterior surface 12 to within a specified tolerance. The position of the exterior surface is maintained as the fixture is moved through the plasma treating process.

The APAP nozzle 20 cooperates with the primary trunnion 60 to move along a path relative to the exterior surface 12. The APAP nozzle 20 directs the plasma jet 22 onto the exterior surface along the path to form a functionalized polymer layer.

Figure 4:
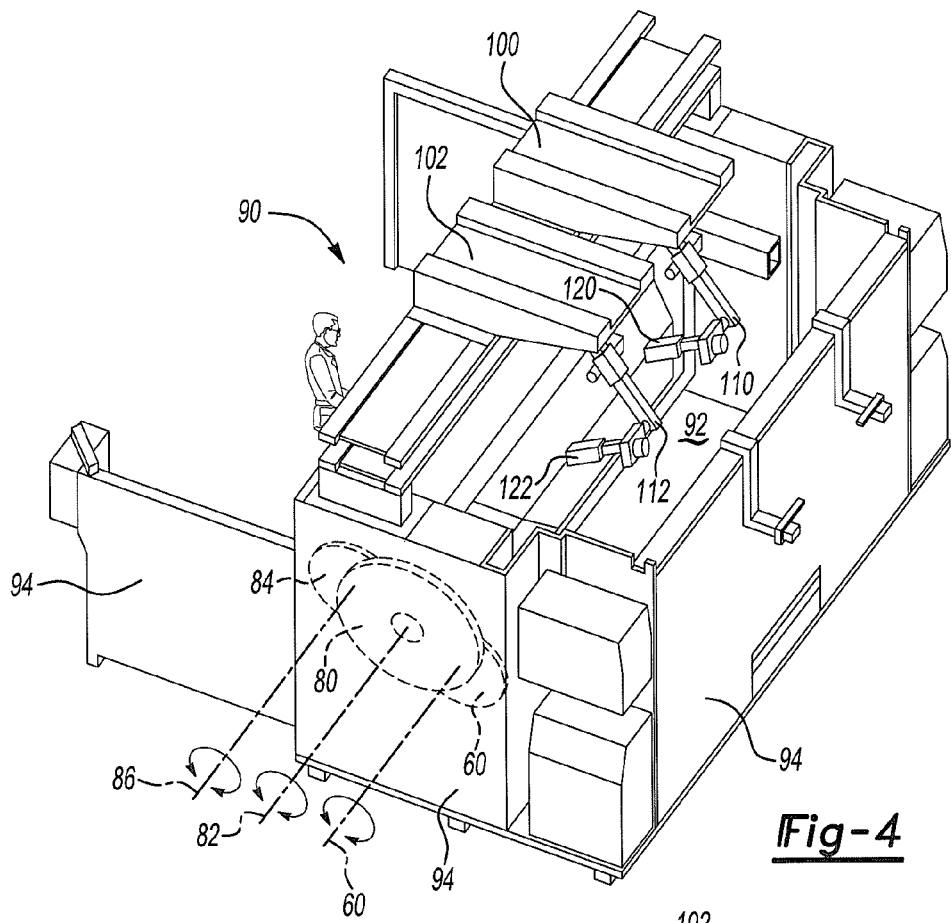
FIG. 4 is a perspective view of the system for plasma treating the plastic component.
Figure 5:
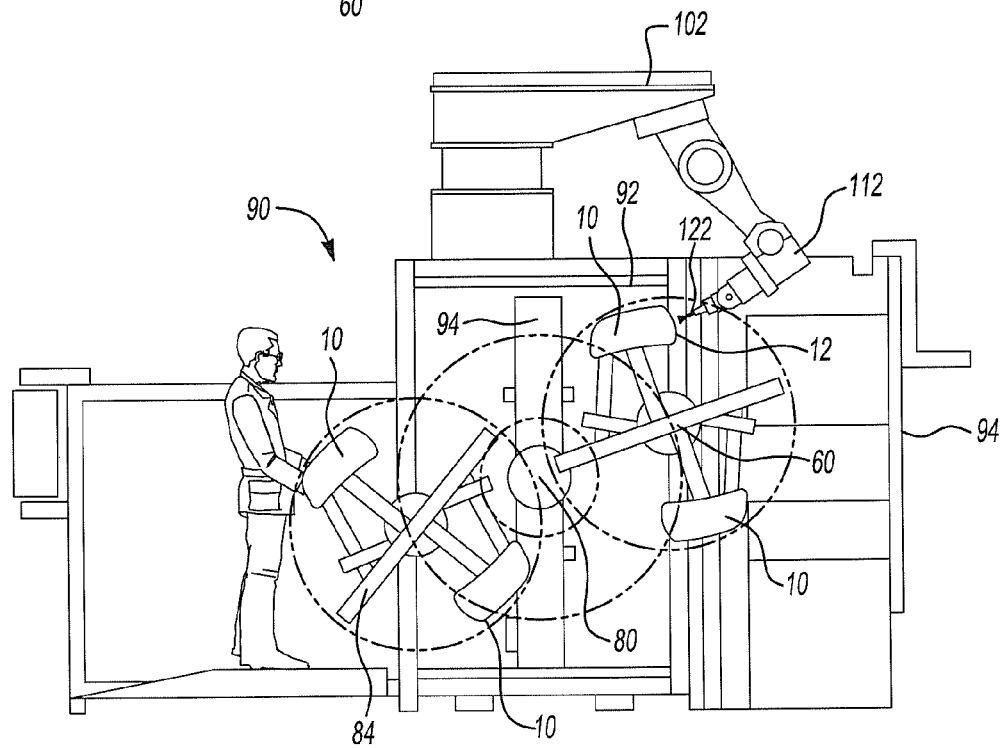
FIG. 5 is a side view of the system for plasma treating a plastic component.

Referring to FIGS. 4 and 5, the system of plasma treating a plastic component 10 is shown to further comprise a second primary trunnion 84 that rotates about a second primary axis 86. The system may also further comprise a secondary trunnion 80 that rotates about a secondary axis 82 between a load position 90 and a treatment position 92. Primary trunnions 60 and 84 may be connected to the secondary trunnion 80 for rotation. In at least one embodiment, the primary trunnions 60 and 84 are attached to the secondary trunnion 80 at diametrically opposed location for rotation about the secondary axis 82. The secondary axis 82 is substantially parallel to both the first primary axis 64 and the second primary axis 86.

The plastic component 10 is positioned on the fixture 16 in the load position 90. The plastic component 10 may be positioned on the fixture 16 manually or by any suitable automated process. The plastic component 10 receives a plasma treatment when the component 10 is in the treatment position 92 creating a functionalized polymer layer on the exterior surface 12. Walls and dividing panels 94 may be used to create physical boundaries between the load position 90 and treatment position 92 to form a protected treatment cell.

The system may further comprise rail gantry assemblies 100 and 102. The rail gantry assemblies position the APAP nozzles 120 and 122 proximate the exterior surface 12 and move the APAP nozzles 120 and 122 relative to the exterior surface 12.

In at least one embodiment, robots 110 and 112 are moveably connected to the rail gantry assemblies 100 and 102. In this configuration, the robots 110 and 112 cooperate with the rail gantry assembly 100 and 102 to position the APAP nozzles 120 and 122 proximate the exterior surface 12 and to move the APAP nozzles 120 and 122 relative to the exterior surface 12 along the path. Alternatively, the rail gantry assemblies 100 and 102 may directly position and move the APAP nozzles 120 and 122 without robots 110 and 112. In yet another embodiment, the robots 110 and 112 may be stationary and may be used to position and move the APAP nozzles 120 and 122 without the rail gantry assemblies 100 and 102.

Referring to FIG. 6, a system is illustrated for plasma treating a plastic component 10 in accordance with an embodiment of the present invention. A plurality of fixtures 16 may be continuously moved along an in-line plasma treating system 150. In at least one embodiment, the fixtures 16 stop at multi-stop stations on the moving line 152. The multi-stop stations may contain index dial tables for moving the fixture 16 between positions.

A plurality of robots 30 may be disposed adjacent to the moving line 152. The robots 30 may position and move the APAP nozzles 20 relative to the exterior surfaces 12 of the plastic components 10 and treat the exterior surfaces 12 with plasma jets 22.

Referring to FIG. 7, an alternative embodiment of a system is illustrated for plasma treating a plastic component 10. A plurality of fixtures 16 may continuously move along a circular plasma treatment system 160. The circular system 160 may have a load area 162 and an unload area 164. Plastic components 10 are positioned on the fixtures 16 in the load area 162. A plurality of robots 30 may be disposed between the load 162 and the unload areas 164. The robots 30 may position and move the APAP nozzles 20 relative to the exterior surfaces 12, treating them with plasma jets 22 to form a functionalized polymer layer. The treated plastic components 10 may be removed at the unload area 164 and transferred to a coating line 166 that moves as the coating is applied to plastic components 10.

Figure 8:
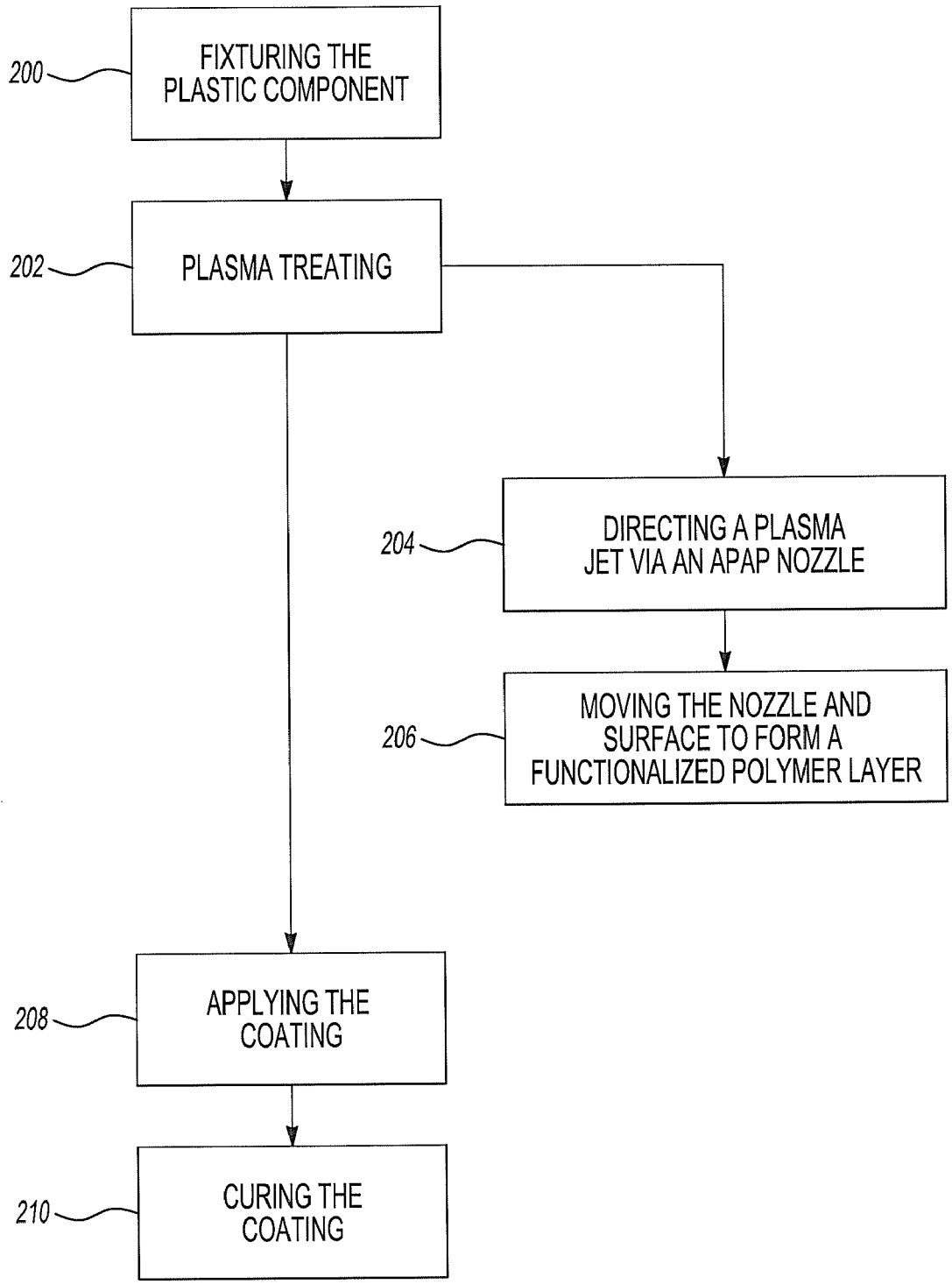
FIG. 8 is a flowchart for plasma treating and coating the plastic component in accordance with an embodiment of the present invention.

Referring to FIG. 8, a method is illustrated for plasma treating and coating a plastic component in accordance with one embodiment of the present invention. The plastic component has an exterior surface with an initial surface energy. At least a portion of the exterior surface is to be decorated with a coating. The coating may be a paint or a paint primer, which may be subsequently coated with a base coat, top coat and/or clear coat. Paint is defined broadly and includes 1K and 2K systems, solvent and water based systems, polymer and/or pre-polymer systems, adhesion promoters, and other suitable paints for coating plastics known to those skilled in the art. Alternatively, the coating may be an adhesive coating, which may be used to bond decorative laminates, labels, and/or and other suitable enhancement to the plastic component. The adhesive coating may be a liquid or a solid, such as for example, a transfer film adhesive. In at least one embodiment, a portion of the inside surface of the plastic component is plasma treated, wherein and adhesive label is affixed.

The method comprises fixturing the plastic component at 200 with at least a portion of the exterior surface substantially within a specified tolerance. The method further comprises plasma treating at 202 the portion of the surface that is to be treated to increase the surface energy to a level which is greater than the initial surface energy. Plasma treating is performed with an APAP nozzle.

Plasma treating may include directing a plasma jet onto the portion of the surface by the APAP nozzle at 204. The plasma jet may produce a single patch of functionalized polymer on the exterior surface. Plasma treating may further include moving the APAP nozzle relative to the exterior surface in a path to create a functionalized polymer layer at 206 with multiple patches being produced in multiple passes of the nozzle relative to the exterior surface.

The method further comprises applying the coating at 208 to the portion of the exterior surface. The coating may be sprayed, electrostatically sprayed, dispensed, laminated or applied by any other suitable means known to those skilled in the art.

The coating has a surface energy that does not substantially exceed the treated surface energy. In at least one embodiment, the treated surface energy is in the range of approximately 38 to 72 dynes/cm. More specifically, the coating surface energy may be in the range of approximately 33 to 67 dynes/cm. In at least one embodiment, the coating surface energy is less than the treated surface energy. In at least another embodiment, the coating surface energy is at least 5 dynes/cm less than the treated surface energy.

The method further comprises curing the coating at 210. Curing is defined broadly and includes polymerization, chemical conversion of the coating reactants, drying, coalescing or any other physical or chemical transformation of the coating.

In at least one embodiment, the plastic component may have a damaged cured paint on the exterior surface, such as for example, a scuff or a mar. Plasma treating the damaged area on the exterior surface by the APAP nozzle as a pre-treatment prior to repainting the exterior surface may provide a suitable method for repairing the damaged area.

In another embodiment, the plastic component may have a mold release on the exterior surface. The mold release may be, for example, a stearate, hydrocarbon, fatty acid or silicone based compound. Alternatively, the mold release may be a scratch or slip agent used to decrease the surface's coefficient of friction. During the process, the mold release agent may be vaporized by the plasma jet.

In another embodiment, the method further comprises power washing at least the portion of the exterior surface. Power washing may be performed either before or after plasma treating the exterior surface.

In another embodiment, the plastic component is and injection molded part and includes flash corresponding to the molds parting lines. The plasma jet is used to remove the flash from the plastic component. Alternatively, the flash may be removed by mechanical means.

Figure 9:
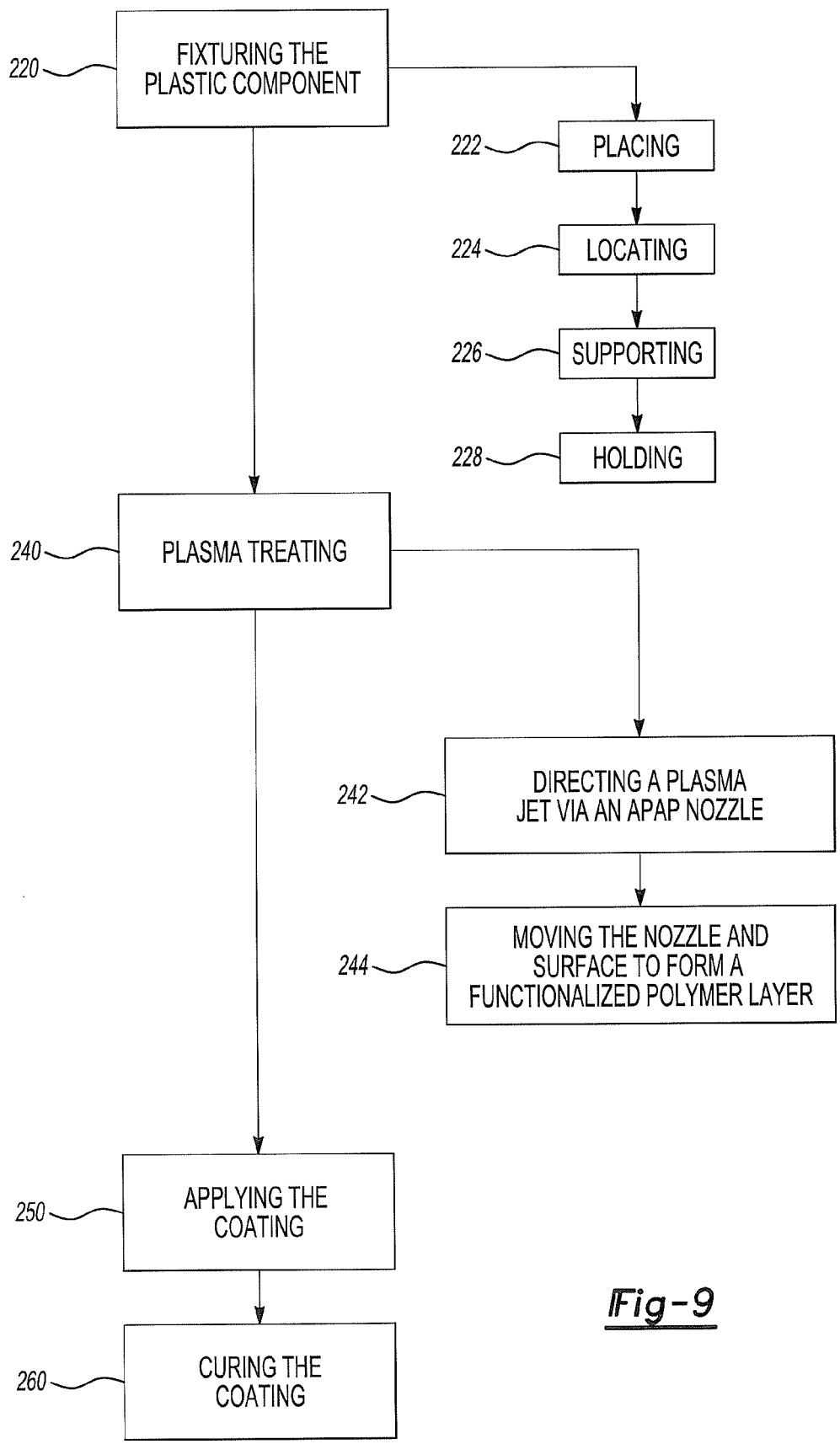
FIG. 9 is a flowchart for plasma treating and coating a plastic component in accordance with another embodiment of the present invention.

Referring to FIG. 9, a flowchart is provided for a method of plasma treating and coating a plastic component in accordance with another embodiment of the present invention. The plastic component has an exterior surface and an inside surface. At least a portion of the exterior surface is decorated by the coating. The method comprises fixturing the plastic component at 220. Fixturing the plastic component includes placing the plastic component at 222 on a fixture that engages the inside surface. The plastic component is located at 224 relative to the fixture via a plurality of locating features provided on both the fixture and the plastic component. The plastic component is supported at 226 via the fixture where the fixture includes a plurality of spaced apart support members. Each of the support members are configured to match a portion of the inside surface of the component adjacent to the support member. The plastic component is held at 228 by a plurality of spaced apart holding devices provided on the fixture. The fixture locates, supports and holds the plastic component to position the desired portion of the exterior surface to within a specified tolerance.

The method further comprises plasma treating at 240 at least the portion of the exterior surface to a treated surface energy in the range of approximately 38 to 72 dynes/cm. Plasma treating includes directing a plasma jet onto the portion of the component by an APAP nozzle at 242. The APAP nozzle is positioned approximately 2 to 20 mm from the selected portion. The plasma jet produces a single area of functionalized polymer on the exterior surface. The APAP nozzle is moved relative to the exterior surface along a path at a speed in the range of approximately 50 to 600 mm/sec to create a functionalized polymer layer at 244 by multiple areas that are produced in multiple passes of the nozzle relative to the exterior surface. The functionalized polymer layer covers at least the selected portion.

The method further comprises applying the coating at 250 to the selected portion. The coating has a coating surface energy in the range of approximately 33 to 67 dynes/cm. The coating is then cured at 260.

In at least one embodiment, the plastic component has an initial surface energy below 38 dynes/cm. In at least one other embodiment, the APAP nozzle is positioned 5 to 15 mm from the exterior surface, and the APAP nozzle and the exterior surface move relative to each other at speed in the range of approximately 250 to 350 mm/sec.

While embodiments of the invention have been illustrated and described, it is not intended that these embodiments illustrate and describe all of the possible forms of the invention. The words used in the specification are words of description rather than limitation, and it should be understood that various changes may be made without departing from the spirit and scope of the invention.

What is claimed:

1. A system for plasma treating a plastic component having an exterior surface exposed to plasma treatment and an inside surface unexposed to plasma treatment, the system comprising:
   at least one fixture including:
      a plurality of locating features extending from the fixture are fitted to a plurality of corresponding portions of the inside surface;
      at least one sensor transmits a first signal in response to the plastic component being positioned on the fixture within a first specified tolerance; and
      a plurality of holding devices extending from the fixture to the inside surface; and
   at least one atmospheric-pressure air plasma robot including:
      a positional sensor transmits a second signal in response to the exterior surface being located within a second specified tolerance; and
      a nozzle adjacent to the positional sensor;
   wherein the locating features engage the inside surface to position the plastic component onto the fixture, the at least one sensor transmits the first signal to actuate the plurality of holding devices and hold the inside surface within the first specified tolerance, the robot is moved relative to the exterior surface of the plastic component until the positional sensor transmits the second signal, and the nozzle is actuated in response to the second signal to direct a plasma jet onto the exterior surface.

2. The system of claim 1 wherein the second specified tolerance is approximately 2 to 20 mm.

3. The system of claim 1 wherein the nozzle and the exterior surface move relative to each other at a speed in the range of approximately 50 to 600 mm/sec.

4. The system of claim 1 wherein the first specified tolerance is within +/−5 mm.

5. The system of claim 4 wherein the fixture is moveable and the exterior surface is held substantially within the first specified tolerance during movement.

6. The system of claim 5 wherein the robot positions and moves the nozzle relative to the exterior surface along a path.

7. The system of claim 6 further comprising a rail gantry assembly that positions and moves the nozzle relative to the exterior surface along the path.

8. The system of claim 6 further comprising at least one primary trunnion with at least one fixture connected to the primary trunnion, the primary trunnion rotates about a primary axis, wherein the nozzle cooperates with the primary trunnion to move relative to the exterior surface along the path.

9. The system of claim 8 further comprising a secondary trunnion that rotates about a secondary axis between a load position and a treatment position, wherein the primary trunnion is rotationally connected to the secondary trunnion, where in the load position the plastic component is positioned onto the fixture and in the treatment position the plasma jet is applied.

10. The system of claim 1 wherein the holding devices are suction cups that interface with a vacuum source.

11. The system of claim 1 wherein the fixture further includes a component presence sensor that transmits a third signal in response to when the plastic component is positioned on the fixture, wherein the nozzle is actuated to direct the plasma jet in response to the third signal rather than the second signal.

12. The system of claim 1 wherein the robot moves along a path to continue plasma treatment over at least a portion of the exterior surface.

13. The system of claim 12 wherein the exterior surface is located within the second specified tolerance while plasma treatment is continued.

14. The system of claim 1 wherein the plasma jet produces a functionalized polymer layer on the exterior surface.

15. The system of claim 1 wherein the fixture is moveable and configured to move along a production line that has multiple stop stations.

16. The system of claim 15 wherein the holding devices are suction cups that are ported to a vacuum source at each stop station but are not ported to the vacuum source during movement.

17. A system for plasma treating a plastic component having an exterior surface exposed to plasma treatment and an inside surface unexposed to plasma treatment, the system comprising:
   at least one fixture including:
      at least one sensor transmits a first signal in response to the plastic component being positioned on the fixture within a first specified tolerance; and
      a plurality of holding devices extending from the fixture to the inside surface; and
   at least one atmospheric-pressure air plasma robot including:
      a positional sensor transmits a second signal in response to the exterior surface being located within a second specified tolerance; and
      a nozzle adjacent to the positional sensor;
   wherein the plastic component is positioned onto the fixture, the at least one sensor transmits the first signal to actuate the plurality of holding devices and hold the inside surface, the at least one sensor transmits the first signal to actuate the plurality of holding devices and hold the inside surface within the first specified tolerance, the first signal actuates the nozzle to direct a plasma jet onto the exterior surface, and the robot moves to continue plasma treatment while the exterior surface is within the second specified tolerance.

18. The system of claim 17 wherein the first specified tolerance is within +/−5 mm.

19. The system of claim 17 further comprising at least one primary trunnion with at least one fixture connected to the primary trunnion, the primary trunnion rotates about a primary axis, wherein the nozzle cooperates with the primary trunnion to move relative to the exterior surface along a path.

20. The system of claim 19 further comprising a secondary trunnion that rotates about a secondary axis between a load position and a treatment position, wherein the primary trunnion is rotationally connected to the secondary trunnion, where in the load position the plastic component is positioned onto the fixture and in the treatment position the plasma jet is applied.

* * * * *